(12) United States Patent
Gugerli et al.

(10) Patent No.: US 8,383,184 B2
(45) Date of Patent: Feb. 26, 2013

(54) DEVICE AND METHOD FOR PRODUCING A FROTHED WHITENED BEVERAGE

(75) Inventors: Raphael Gugerli, Genolier (CH); Jean-Luc Thuliez, Le Landeron (CH)

(73) Assignee: Nestec S.A., Vevey (CH)

( * ) Notice: Subject to any disclaimer, the term of this patent is extended or adjusted under 35 U.S.C. 154(b) by 314 days.

(21) Appl. No.: 12/994,532

(22) PCT Filed: May 26, 2009

(86) PCT No.: PCT/EP2009/056368
§ 371 (c)(1),
(2), (4) Date: Nov. 24, 2010

(87) PCT Pub. No.: WO2009/144219
PCT Pub. Date: Dec. 3, 2009

(65) Prior Publication Data
US 2011/0081464 A1    Apr. 7, 2011

(30) Foreign Application Priority Data
May 28, 2008    (EP) ..................................... 08157056

(51) Int. Cl.
*A47J 31/00*    (2006.01)
(52) U.S. Cl. ........ 426/569; 426/590; 426/594; 426/506; 426/519; 426/520
(58) Field of Classification Search .................. 426/519, 426/520, 590–599, 564, 569, 570, 506
See application file for complete search history.

(56) References Cited

U.S. PATENT DOCUMENTS

| | | | |
|---|---|---|---|
| 4,388,338 A | 6/1983 | Wittenborg | |
| 5,498,757 A * | 3/1996 | Johnson et al. | 426/520 |
| 6,183,800 B1 * | 2/2001 | van Straten et al. | 426/569 |
| 6,192,785 B1 * | 2/2001 | Trida et al. | 99/284 |
| 6,405,637 B1 | 6/2002 | Cai | |
| 2004/0071841 A1 | 4/2004 | Carhuff et al. | |
| 2004/0241307 A1 * | 12/2004 | Knitel | 426/594 |
| 2005/0095341 A1 | 5/2005 | Sher et al. | |
| 2008/0102178 A1 * | 5/2008 | Thakur et al. | 426/511 |
| 2008/0233264 A1 * | 9/2008 | Doglioni Majer | 426/594 |
| 2008/0245239 A1 * | 10/2008 | Fischer et al. | 99/323.3 |
| 2008/0260927 A1 * | 10/2008 | Steenhof et al. | 426/569 |
| 2009/0011105 A1 * | 1/2009 | Mahlich et al. | 426/564 |
| 2009/0047402 A1 * | 2/2009 | Schodler | 426/474 |
| 2009/0092728 A1 * | 4/2009 | Coccia et al. | 426/569 |
| 2009/0223375 A1 * | 9/2009 | Verbeek | 99/287 |

FOREIGN PATENT DOCUMENTS

| | | |
|---|---|---|
| EP | 1702544 | 9/2006 |
| EP | 1932457 | 6/2008 |
| WO | 02087400 | 11/2002 |

* cited by examiner

*Primary Examiner* — Drew E Becker
(74) *Attorney, Agent, or Firm* — K&L Gates LLP

(57) ABSTRACT

The invention concerns a method for hygienically and automatically producing from a beverage dispensing device a frothed whitened beverage in a receptacle comprising upon the actuation of a command on the device the following operations controlled by a control unit of said device: —a. metering and delivering a pre-warming volume of heated water in a receptacle for prewarming a whitening food component already contained in the receptacle and forming a warmed liquid in said receptacle, —b. metering and delivering a frothing volume of heated water in the form of at least a pressurized jet directed toward the receptacle for frothing the warmed liquid, —c. producing and delivering in the receptacle a liquid mixture made of a second food component and a metered mixing volume of water. The invention also concerns a device for implementing said method.

11 Claims, 4 Drawing Sheets

US 8,383,184 B2

DEVICE AND METHOD FOR PRODUCING A FROTHED WHITENED BEVERAGE

BACKGROUND OF THE INVENTION

The invention relates to a method for producing a whitened liquid with a stable top layer of froth in an hygienic and automatic manner. The invention also relates to a device for carrying out such method There is a need for providing a simple method through a beverage producing device that enables to deliver in a term of a few seconds a whitened coffee base beverage with a stable foamy top such as a cappucino-type beverage. All the existing methods encounters important drawbacks. Usually, frothing of the whitening liquid, such as a milk-based liquid, requires the use mechanical rotating elements in the device. Such elements must be cleaned after use to avoid bacterial growth and degraded food odor and taste to develop in the system.

Therefore, it exists systems that remove the need for cleaning of whipping elements. For instance, WO 02/087400 relates to a method for the preparation of a foamed drink from a capsule comprising the operations of injecting liquid in the capsule to mix with the foamable food component and allowing the foamable food component mixed with the liquid to escape from the capsule into the receptacle followed by injecting a high-velocity jet of liquid into the receptacle.

GB 2 379 624 relates to a beverage making apparatus comprising a liquid injection low diameter nozzle with a tapered bore for reducing risk of blocking the bore with solid scale residue. U.S. Pat. No. 4,388,338 relates to a method for preparing beverages from powder food component in portions by first filling the container partially with water under slight overpressure and by adding cold pressure water to the container while immediately after the container is partially filled with water under slight pressure for effectively mixing the liquid.

There is a need for a simpler method than existing methods, in particular, that requires minimal intervention of the user for the preparation of a stable, frothed whitened beverage, in particular, a cappuccino-type beverage.

There is also a need for preparing a hot frothed beverage from a portion of refrigerated liquid food component poured in the receptacle while ensuring a reduction of gradient of temperature in the whole beverage, which is unpleasant for the drinker.

There is also a need for a device with a simple water feed circuit.

BRIEF SUMMARY OF THE INVENTION

For that, the invention consists in a method for hygienically and automatically producing a frothed whitened beverage in a receptacle comprising upon the actuation of a command on a beverage dispensing device the following operations controlled by a control unit of said device:

a- metering and delivering a pre-warming volume of heated water in a receptacle for prewarming a whitening food component already contained in the receptacle and forming a warmed liquid in said receptacle, b- metering and delivering a frothing volume of heated water in the form of at least a pressurized jet directed in the receptacle for frothing the warmed liquid, c- producing and delivering in the receptacle a liquid mixture made of a second food component and a metered mixing volume of water.

Preferably, the whitening food component is in a liquid form. It can be fresh milk or a liquid milk concentrate. The whitening food component is typically a liquid taken from a refrigerated storing place, e.g., a fridge, and poured in the receptacle by the user. Therefore, the food component is placed in the receptacle at a temperature below ambient, i.e., 4 to 12 degrees Celsius. According to the method of the invention, the prewarming water volume serves the purpose to rise the temperature of this food component, before frothing, in order to obtain a finally warmed froth layer on the top of the beverage having an elevated temperature.

In an alternative, the whitening food component can be a powdered food component, e.g., agglomerated milk powder.

According to a possible mode, the operations a- to c- are delivered successively. Therefore, this multi-step approach ensures that the temperature throughout the foamed part of the beverage is more homogeneous.

In particular, the prewarming water volume is preferably larger than the frothing water volume. The ratio of the frothing water volume to the prewarming water volumes can be comprised between 1:4 and 1:8. Preferably, the volume of prewarming water is at least 50 mL for a recipe using fresh refrigerated milk as the whitening food component. The volume of prewarming water can be more than 80 mL, for instance about 95 mL, for a recipe using evaporated milk.

In order to ensure a sufficiently high temperature of the foam, it is important that the prewarming water volume is heated in the device at a stabilized temperature of at least 85° C. The stabilized temperature that is measured is the temperature at the liquid outlet as dispensed from the device.

A relatively small water frothing volume can be sufficient to energically froth the warmed liquid in the receptacle provided it is in the form of a pressurized jet. For instance, water volumes of less than 20 mL, e.g., 17 mL can be sufficient to froth 130 mL of warmed liquid corresponding to 70 mL of fresh milk and 60 mL of hot water. Also, less than 20 mL, e.g., 17 mL of frothing water is sufficient to froth 130 mL of warmed liquid corresponding to 35 mL of condensed milk and 95 mL of hot water. Of course, larger volumes of the whitening food component will require proportionally larger prewarming water volumes and larger frothing water volumes. This frothing volume is also depending on the pressurized jet's diameter and the pump pressure.

Therefore, the frothing water volume is preferably delivered in the receptacle through a nozzle of a diameter comprised between 0.2 and 1 mm, preferably between 0.3 and 0.9 mm. In another embodiment, the frothing water can be delivered through several nozzles. In this latter case, preferably, the sum of the sections of the frothing nozzles outlets is the same presents the same value as the section of a unique frothing nozzle presenting a diameter comprised between 0.3 and 1 mm.

According to the method of the invention, the liquid mixture, made of the said second food component, is usually produced by dosing a dry powder dose of the second food component from a reservoir in a mixing chamber and feeding in said mixing chamber the mixing water volume in the mixing chamber and delivering the mixture through a chamber outlet of the mixing chamber. Preferably, the mixing chamber does not comprise any inside moving parts. In particular, the mixing chamber is carried out only by means of at least one pressurized jet of water entering the mixing chamber. A preferred mixing chamber is described in the co-pending European patent application number EP 06125772.1; the content of which is incorporated herein by reference. The pressurized jet in the mixing chamber is obtained by passing water through a nozzle of a diameter comprised between 0.3 and 0.8 mm. The flow conditions through the nozzle can be such that a linear velocity in the order of from 10 to 50 m/sec., more preferably 12-25 m/sec., is produced.

According to a preferred mode, the prewarming water volume is fed through the mixing chamber and via the chamber outlet into the receptacle.

The invention relates too to a second method for hygienically and automatically producing from a beverage dispensing device a frothed whitened beverage in a receptacle comprising upon the actuation of a command on the device the following operations controlled by a control unit of said device:

a'. metering and delivering a frothing volume of water in the form of a pressurized jet directed toward a receptacle comprising a fresh milk already contained in the receptacle for frothing the warmed liquid, b'. producing and delivering in the receptacle a liquid mixture made of a second food component and a metered mixing volume of water.

It has been effectively observed that a simple jet of water, either cold or warm, enables an efficient frothing of fresh milk without the necessity of using steam or any complicated apparatus. The use of cold water for frothing milk is particularly interesting for the preparation of cold beverages like iced cappuccino or iced tea.

DETAILED DESCRIPTION OF THE INVENTION

Figure 1:
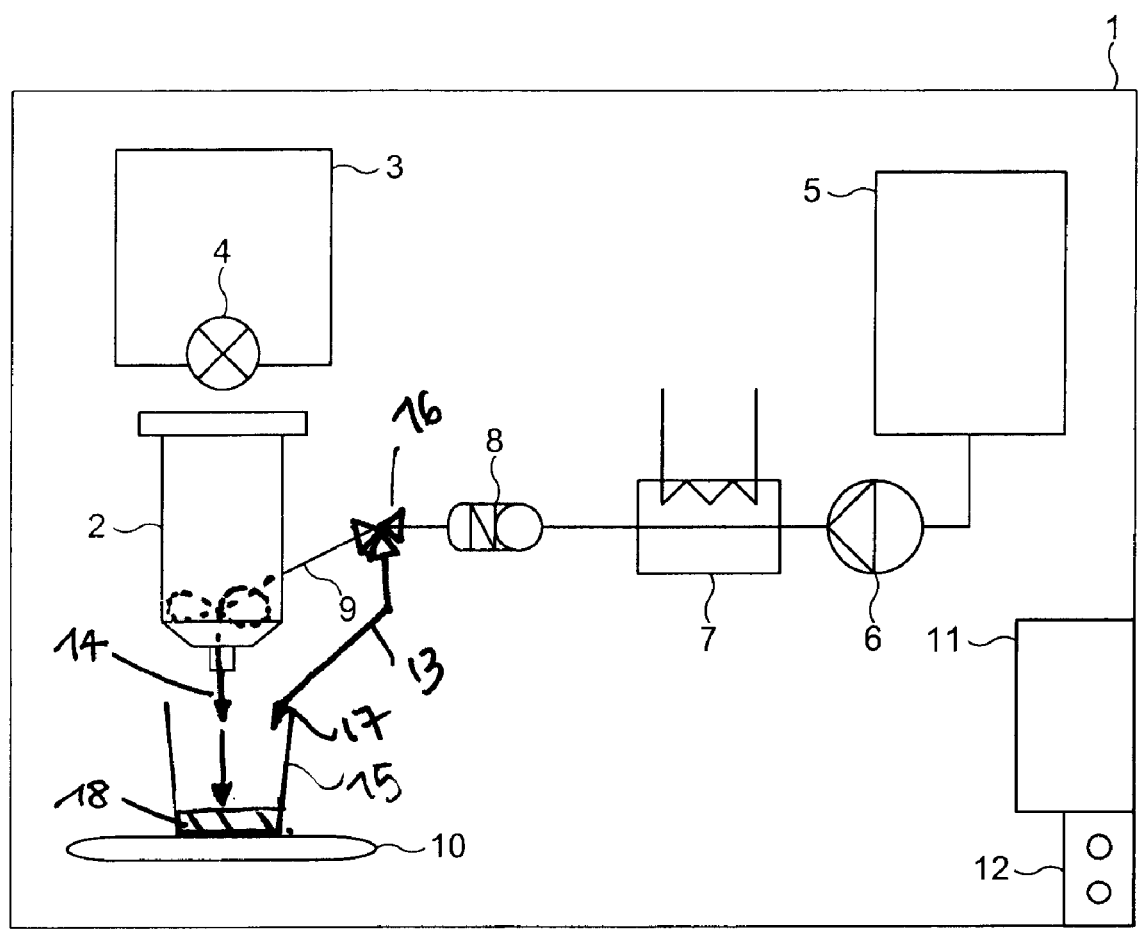
FIG. 1 illustrates the general principle of the device of the invention during the prewarming operation according to the method of the invention.

Referring to FIG. 1, a beverage production apparatus 1 of the invention is represented that includes a mixing device 2 for producing a liquid mixture from ingredient and water entering the device.

The beverage production apparatus comprises a reservoir of soluble ingredient 3 placed above the mixing device which is coupled with a dosing system 4. The dosing system 4 has the primary function to meter upon request doses of ingredient into the mixing device 2. The reservoir 3 can be a hopper which is permanent or a disposable package containing the soluble ingredient. The dosing system 4 can be any suitable system such as a dosing screw or a reciprocating dosing piston. The dosing technology is also of course dependent on the nature of the soluble ingredient. The soluble ingredient is typically a dry food powder. However, it could also be a liquid concentrate. The device is fed upon request with ingredient automatically as prompted by a controller 11 and command 12.

A water feed circuit is provided in the apparatus to be able to feed the mixing device 2 with more particularly hot water. For that, a water reservoir 5 is provided that can be replenished with fresh water. A water pump 6 transports the water from the reservoir 5 to a water heating system 7 such as a thermoblock or a cartridge type heater and to eventually a non-return valve 8. The pump can be any type of pump such as a piston pump, diaphragm pump or a peristaltic pump. Finally water is fed into the device by a tube means 9.

As illustrated in FIG. 1, the mixing device 2 can be placed directly above a service tray 10 onto which is placed a receptacle 15, i.e., cup or glass, to receive the frothed liquid.

A controller 11 is further provided to coordinate the different operations of the method of the invention. In particular, the controller can control the pump 6 and the dosing system separately or simultaneously.

The water circuit further comprises a derived water line 13 which is directed to provide water directly into the receptacle 15. The derived water line 13 is designed to provide water in the form of a high-velocity jet inside the receptacle 15. For this purpose, it terminates by a nozzle 17 comprising a reduced diameter in the order of 0.2 to 1 mm. The derived water line 13 is connected to the main line by a valve 16 which is selectively controlled by the control unit 11. The valve can be any type of valve. In a preferred mode, the valve is described in co-pending patent application WO 2008/02563 and referring to a multiple-way valve device.

FIG. 1 shows a first operation of the method for preparation of a hot cappuccino-type beverage. For starting the method, a receptacle 15 is filled with a dose of a whitening food component by the user himself. The receptacle is placed under the mixing and frothing device 2 in the service area 10. The whitening component may be a refrigerated dairy based component such as fresh milk or condensed milk. Depending on the nature of the liquid filled in the receptacle, the user is prompted to select a specific command 12 to initiate the automatic start of the beverage preparation. Once, the command pressed, the sequences of successive operations runs automatically.

The first operation consists in prewarming the whitening component 18 contained in the receptacle 15 by adding a heated volume of water 14 via the main water line 9 at a relatively low velocity. For this, the valve 16 is controlled by the control unit 11 to open the main water line leading to the mixing system 2. The pump 6 is activated and so is the heater 7. The heater may require a prewarming period of several seconds before the pump 6 is actually run. The temperature may be controlled by a thermostat or any suitable sensor device known in the art. The whitening component 18 in the receptacle 15 being usually at most at ambient or refrigerated temperature, it is necessary to ensure during this operation to raise its temperature at least above 50° C. The heater 7 preferably heats water close to its boiling point to compensate for the heat loss of the water in contact with the surfaces of the device and so to be able to raise the temperature of the whitening component 18 in the receptacle 15 sufficiently. During this phase, it is preferable to avoid creating frothing of the whitening component 18 in the receptacle 15 because foam acts like a heat insulator and may reduce the final temperature of the liquid or creates gradients in the beverage. Therefore, it is an advantage that the velocity of water 14 is slowed down in the mixing chamber 2. The amount of water 14 dosed may depend on the nature of the whitening beverage. The water volume during this operation is comprised between 30 and 100 mL.

Figure 2:
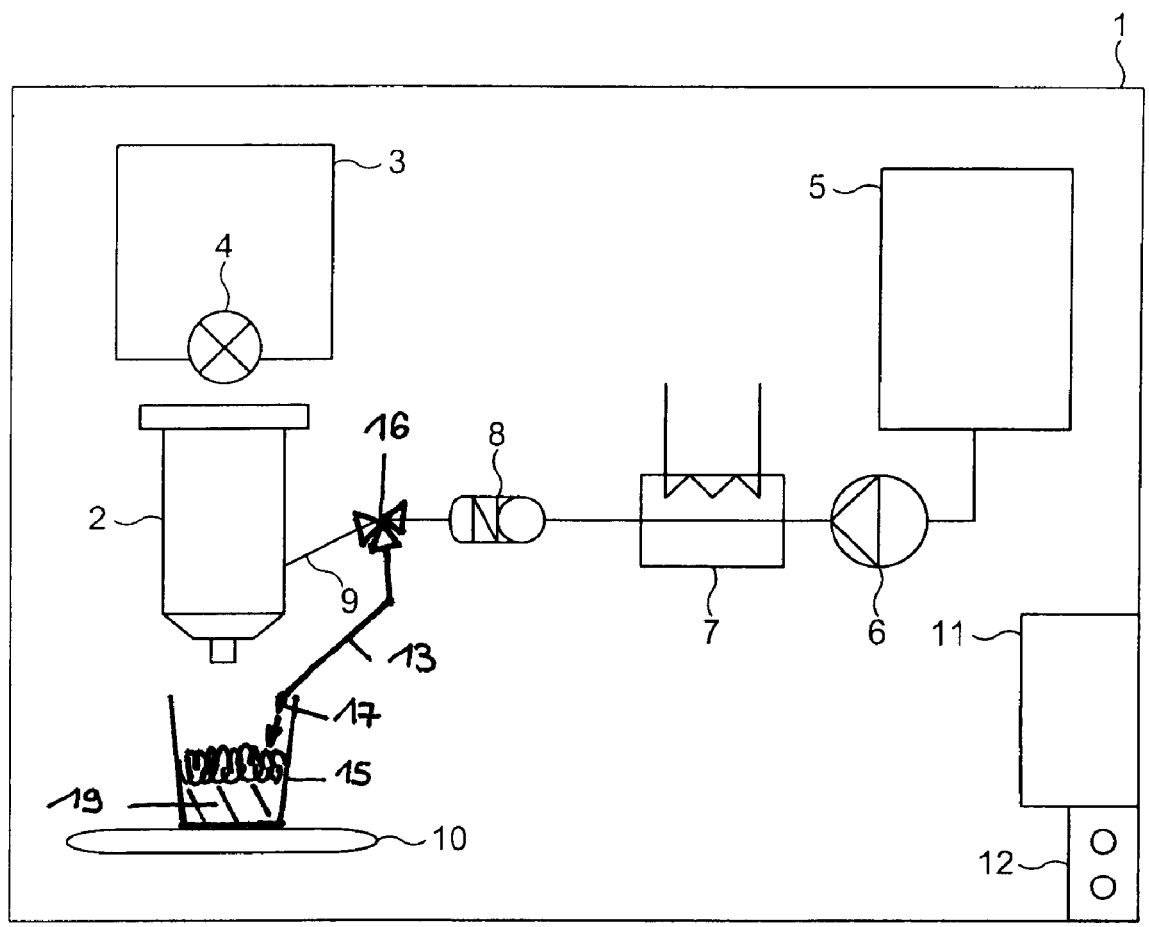
FIG. 2 illustrates the frothing operation by the device of the invention.

In the next operation illustrated in FIG. 2, the prewarmed whitening liquid 19 is then frothed by adding a smaller volume of heated water at high velocity through the nozzle 17 of the derived water line 13 directed to the receptacle 15. For this, the control unit 11 operates the valve 16 to close main water 9 and open derived water line 13. The pump 6 may be run at the same speed or lower or higher speed if necessary. The volume of water delivered through the nozzle is comprised between 10 and 50 mL. The temperature must remain sufficiently high to avoid any drop of temperature of the liquid and foam in the receptacle. For this, it is preferred that the heater 7 is maintained active during the two phases or at least re-started during this second phase sufficiently early in case it has been interrupted during the first phase. The water temperature must remain in the order of 92-96° C. at the outlet of the heater 7.

Figure 3:
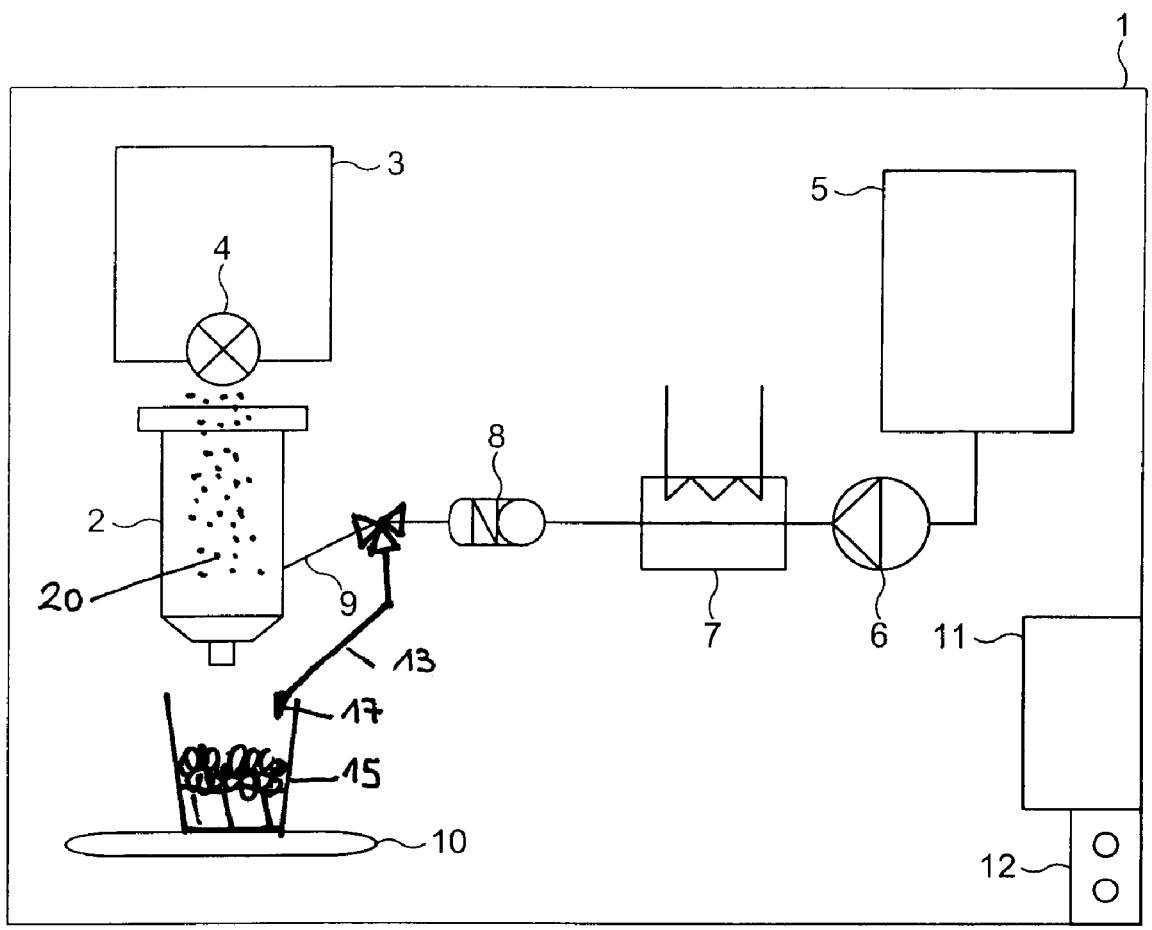
FIG. 3 illustrates the subsequent operation of dosing of the second component in the device of the invention.

In the next operation illustrated in FIG. 3, the dosing system 4 meters a dose 20 of soluble ingredient from reservoir of soluble ingredient 3 inside the mixing device 2.

Figure 4:
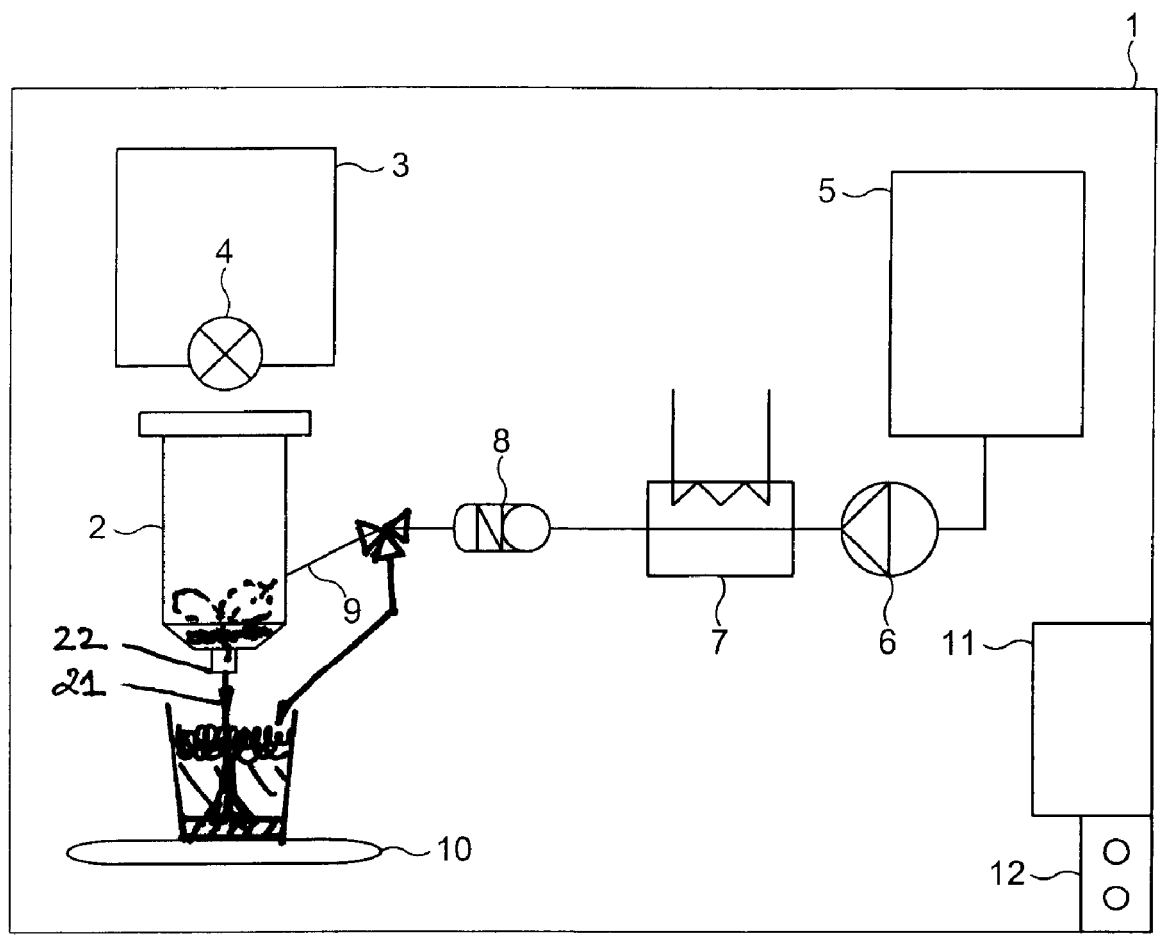
FIG. 4 illustrates the next operation of mixing and delivery of the mixture of the second component in the receptacle.

In the last operation illustrated in FIG. 4, a metered volume of heated water is added in the mixing device 2 via the main water line 9. For this, the valve 16 is controlled by the control unit 11 to open the main water line 9 leading to the mixing system 2. The pump 6 is activated and so is the heater 7. In the mixing device 2, the dose of soluble ingredient and the heated water mix so that the soluble ingredient dissolves in the water and the obtained liquid mixture 21 is delivered into the receptacle 15 through the mixing device outlet 22. When the chamber is empty, a very small amount of water can be injected into this chamber in order to clean the coffee foam which reminds at the bottom of the chamber. This provides a clean water for the prewarming phase of the next cappuccino.

The invention claimed is:

1. Method for hygienically and automatically producing from a beverage dispensing device a frothed whitened beverage in a receptacle comprising upon the actuation of a command on the device the following operations controlled by a control unit of the device:
   a. metering and delivering a volume of heated water into a receptacle for prewarming a liquid whitening food component that is contained in the receptacle and forming a warmed liquid in the receptacle,
   b. metering and delivering a frothing volume of heated water in the form of at least a pressurized jet directed toward the receptacle for frothing the warmed liquid, and
   c. producing and delivering into the receptacle a liquid mixture made of a second food component and a metered mixing volume of water.

2. Method according to claim 1, wherein operations a. to c. are successively performed.

3. Method according to claim 1, wherein the volume of heated water is greater than the frothing water volume.

4. Method according to claim 3, wherein the ratio of the frothing water volume to the volume of heated water is between 1:4 and 1:8.

5. Method according to claim 1, wherein the volume of heated water is heated in the device at a stabilized temperature of at least 85° C.

6. Method according to claim 1, wherein the frothing water volume is delivered into the receptacle through a nozzle having a diameter of between 0.2 and 1 mm.

7. Method according to claim 1, wherein in step c. the liquid mixture is produced by dosing a dry powder dose of a second food component from a reservoir in a mixing chamber and feeding into the mixing chamber the mixing water volume in the mixing chamber and delivering it through a chamber outlet of the mixing chamber.

8. Method according to claim 7, wherein the mixing in the mixing chamber is performed only by means of at least one pressurized jet of water entering the mixing chamber.

9. Method according to claim 8, wherein the pressurized jet in the mixing chamber is obtained by passing water through a nozzle having a diameter of between 0.3 and 0.8 mm.

10. Method according to claim 9, wherein the volume of heated water is fed through the mixing chamber and via the chamber outlet into the receptacle.

11. Method according to claim 10, wherein the volume of heated water and frothing water volume are successively delivered upon control of a valve that selectively directs the flow of heated water from the water heater to the mixing chamber for the volume of heated water and to the receptacle for the frothing water volume.

\* \* \* \* \*